(12) United States Patent
Noble et al.

(10) Patent No.: US 9,026,161 B2
(45) Date of Patent: May 5, 2015

(54) PHASED ARRAY ANTENNA HAVING ASSIGNMENT BASED CONTROL AND RELATED TECHNIQUES

(75) Inventors: William B. Noble, Santa Monica, CA (US); Walter F. Schoonover, Jr., Leo, IN (US); Larisa Angelique Natalya Stephan, Los Angeles, CA (US); James Skora, Arcola, IN (US)

(73) Assignee: Raytheon Company, Waltham, MA (US)

( * ) Notice: Subject to any disclaimer, the term of this patent is extended or adjusted under 35 U.S.C. 154(b) by 344 days.

(21) Appl. No.: 13/451,107

(22) Filed: Apr. 19, 2012

(65) Prior Publication Data

US 2013/0281145 A1 Oct. 24, 2013

(51) Int. Cl.
*H04B 7/00* (2006.01)
*H04W 16/28* (2009.01)

(52) U.S. Cl.
CPC .................................. *H04W 16/28* (2013.01)

(58) Field of Classification Search
CPC ..... H04W 72/10; H04W 76/02; H04W 16/32; H04W 48/18; H04W 8/183; H04W 48/16; H04W 88/06
USPC ............. 455/418, 422.1, 435.1, 435.2, 435.3, 455/450, 500, 507, 509, 514, 550.1, 552.1, 455/553.1, 562.1; 370/338
See application file for complete search history.

(56) References Cited

U.S. PATENT DOCUMENTS

| | | |
|---|---|---|
| 3,345,631 A | 10/1967 | Chamberlin |
| 4,445,119 A | 4/1984 | Works |
| 4,593,286 A | 6/1986 | Mathews et al. |
| H126 H | 9/1986 | Allen et al. |
| 5,008,680 A | 4/1991 | Willey et al. |
| 5,247,677 A | 9/1993 | Welland et al. |
| 5,258,764 A | 11/1993 | Malinowski |
| 5,428,789 A | 6/1995 | Waldrom, III |
| 5,587,714 A | 12/1996 | Chu et al. |
| 5,854,609 A | 12/1998 | Pyo et al. |
| 6,023,242 A | 2/2000 | Dixon |
| 6,034,643 A | 3/2000 | Nishikawa et al. |

(Continued)

FOREIGN PATENT DOCUMENTS

| | | |
|---|---|---|
| EP | 0 639 035 A1 | 2/1995 |
| EP | 1 335 618 A2 | 8/2003 |

(Continued)

OTHER PUBLICATIONS

Chelton, Inc., "IGA-3000 Intermediate Gain Antenna" brochure, www.cheltonsatcom.com; 2 pages (not included, could not be located).

(Continued)

*Primary Examiner* — Nhan Le

(74) *Attorney, Agent, or Firm* — Daly, Crowley, Mofford & Durkee, LLP

(57) ABSTRACT

Disclosed subject matter relates to techniques for allowing multiple transmit/receive assignments to share antenna resources in an efficient manner. The techniques may be used with, for example, transmit/receive assignments that are non-deterministic in nature. In some implementations, transmit/receive assignments each have a corresponding priority value. Transmit/receive assignments are permitted to contend for available antenna resources based, at least in part, on priority.

32 Claims, 3 Drawing Sheets

(56) References Cited

U.S. PATENT DOCUMENTS

| | | | |
|---|---|---|---|
| 6,396,449 | B1 | 5/2002 | Osterhues et al. |
| 6,473,036 | B2 | 10/2002 | Proctor, Jr. |
| 6,646,599 | B1 | 11/2003 | Apa et al. |
| 6,686,885 | B1 | 2/2004 | Barkdoll et al. |
| 6,744,411 | B1 | 6/2004 | Osterhues et al. |
| 6,897,806 | B2 | 5/2005 | Toshev |
| 7,027,409 | B2 | 4/2006 | Cain |
| 7,140,022 | B2 | 11/2006 | Binns |
| 7,257,083 | B2 | 8/2007 | Bansal et al. |
| 7,830,307 | B2 | 11/2010 | Asbridge, Jr. |
| 7,848,386 | B2 | 12/2010 | Rofougaran |
| 7,898,476 | B2 | 3/2011 | Nichols et al. |
| 7,933,628 | B2 | 4/2011 | Kish et al. |
| 2001/0003443 | A1 | 6/2001 | Velazquez et al. |
| 2002/0070897 | A1 | 6/2002 | Vail et al. |
| 2006/0009232 | A1 | 1/2006 | Vakil et al. |
| 2006/0100777 | A1 | 5/2006 | Staton et al. |
| 2006/0292981 | A1 | 12/2006 | Fall et al. |
| 2008/0075146 | A1 | 3/2008 | Rofougaran |
| 2009/0180451 | A1* | 7/2009 | Alpert et al. ............ 370/338 |
| 2010/0091749 | A1 | 4/2010 | Kish et al. |
| 2010/0099451 | A1 | 4/2010 | Saban et al. |
| 2011/0013581 | A1* | 1/2011 | Lee et al. ............ 370/329 |
| 2011/0014935 | A1 | 1/2011 | Park et al. |
| 2011/0038333 | A1* | 2/2011 | Yi et al. ............ 370/329 |
| 2011/0105032 | A1* | 5/2011 | Maruhashi et al. ............ 455/59 |

FOREIGN PATENT DOCUMENTS

| | | |
|---|---|---|
| EP | 1 610 145 A1 | 12/2005 |
| EP | 1 739 449 A1 | 1/2007 |
| EP | 1 793 633 A1 | 6/2007 |
| WO | WO 02/093819 A1 | 11/2002 |
| WO | WO 2004/038984 A2 | 5/2004 |

OTHER PUBLICATIONS

Noble, et al.; "Memory Based Electronically Scanned Array Antenna Control;" U.S. Appl. No. 13/350,636, filed Jan. 13, 2012.
Stimson; "Introduction to Airborne Radar;" Hughes Aircraft Company; Feb. 18, 1999; pp. 5 pages.
PCT Search Report of the ISA for PCT/US2008/051614 dated Oct. 16, 2008.
Written Opinion of the ISA for PCT/US2008/051614 dated Oct. 16, 2008.
U.S. Appl. No. 12/017,916, filed Jan. 22, 2008.
Office Action dated Nov. 21, 2013 for Appl. No. EP08780374.8.
Response to Office Action dated Nov. 21, 2013 as filed on Jan. 14, 2014 for Appl. No. EP08780374.8.
Office Action dated Jul. 11, 2012 for Appl. No. 199878.
Reponse to Office Action dated Jul. 11, 2012 as filed on Oct. 11, 2012 for Appl. No. 199878.
Notice of Allowance dated Nov. 14, 2013.
Letter from Foreign Associate for European Patent Application No. 12171493.5-1854 dated Jul. 10, 2013.
European Search Report for European Patent Application No. 12171493.5-1854 dated Jul. 8, 2013.
Letter from Foreign Associate for Israeli Patent Application No. 199878 dated Jul. 11, 2013.
Office Action from Israel Patent Office dated Jun. 11, 2012 for Israeli Patent Application No. 199878.
Reponse to Office Action dated Jun. 11, 2012 for for Israeli Patent Application No. 199878 filed on Oct. 11, 2012.
Response to the European Search Report dated Jul. 8, 2013 for European Patent Application No. 12171493.5-1854 filed Jan. 7, 2014.

* cited by examiner

PHASED ARRAY ANTENNA HAVING ASSIGNMENT BASED CONTROL AND RELATED TECHNIQUES

STATEMENT REGARDING FEDERALLY SPONSORED RESEARCH

This invention was made with Government support awarded by the Navy. The Government has certain rights in the invention.

FIELD

The subject matter disclosed herein relates generally to wireless transmission and/or reception and, more particularly, to techniques for providing access to antenna resources for a plurality of transmit/receive assignments.

BACKGROUND

Many radio frequency applications exist in which it is necessary to share antenna resources among multiple different transmission and/or reception tasks. For example, in a cellular base station, it may be desirable or necessary to share antenna resources among a number of concurrent user connections being made through the base station. In many of these applications, scheduling-based approaches are typically used to provide antenna sharing. However, scheduling strategies may be difficult or impossible to use when transmission and/or reception tasks are non-deterministic. Antenna sharing strategies are needed that may be used with non-deterministic transmission and/or reception tasks.

SUMMARY

In accordance with the concepts, systems, circuits, and techniques described herein, a system to process transmit/receive assignments using an array antenna includes a number of channel units each configured to perform a corresponding transmit/receive assignment that requires intermittent access to antenna resources. Each transmit/receive assignment has an associated priority and generates a request when antenna access is needed. The system further includes an allocation circuit (or processor) which includes contention logic to allocate antenna resources to the plurality of channel units based, at least in part, on assignment priority and time of request.

With this particular arrangement, a system which utilizes antenna sharing strategies that may be used with non-deterministic transmission and/or reception tasks is provided. By utilizing transmit/receive assignments having an associated priority and which generate a request when antenna access is needed, it is not necessary to use a conventional scheduling-based approach.

In one embodiment, the antenna resources include multiple array segments and the contention logic can allocate each of the multiple array segments to a different channel unit.

In one embodiment, each transmit/receive assignment has an associated antenna beam. In one embodiment, the system further includes a beam compatibility matrix to store information about antenna beams associated with the transmit/receive assignments that are compatible with one another. In one embodiment, the contention logic is configured to check the beam compatibility matrix to make an allocation decision.

In one embodiment, the system further includes at least one memory to store information mapping transmit/receive assignments to corresponding beam parameter data for use in configuring an allocated antenna resource.

In one embodiment, the system further includes an antenna configuration manager to rapidly configure an allocated antenna resource for use with a channel unit in response to an allocation decision of the contention logic, wherein the antenna configuration manager uses information retrieved from the at least one memory to configure the allocated antenna resource.

In one embodiment, the system further includes a beam update manager to update the at least one memory as beams associated with transmit/receive assignments change.

In one embodiment, the at least one memory includes an assignment-to-beam lookup table (LUT) to store information mapping transmit/receive assignments to specific antenna beams and a beam parameter matrix to store information mapping specific antenna beams to antenna beam parameters for use in configuring an antenna resource.

In one embodiment, the at least one memory includes an assignment-to-beam lookup table (LUT) to store information mapping transmit/receive assignments to antenna beam parameters for use in configuring an antenna resource.

In one embodiment, the channel units are implemented using reconfigurable hardware.

In one embodiment, the system further includes an assignment manager to manage an allocation of channel units to transmit/receive assignments. In one embodiment, the assignment manager is configured to reconfigure a channel unit for use with a different transmit/receive assignment. In one embodiment, the assignment manager is configured to receive a list of new assignments from a controller and accept or reject individual new assignments for allocation of a channel unit.

In one embodiment, the system further includes a switch matrix to provide a radio frequency path between a channel unit and an allocated antenna resource in response to a decision of the contention logic.

In accordance with a further aspect of the concepts, systems, circuits and techniques described herein, a method includes receiving requests from multiple channel units for access to antenna resources, each of the multiple channel units implementing an associated transmit/receive assignment having a corresponding priority and allocating antenna resources to one or more of the multiple channel units in response to the requests based, at least in part, on priority and request time of arrival.

With this particular arrangement, a method which utilizes antenna sharing strategies that may be used with non-deterministic transmission and/or reception tasks is provided. By utilizing transmit/receive assignments having an associated priority and which generate a request when antenna access is needed, it is not necessary to use a conventional scheduling-based approach. Rather, each channel unit may convey a need for resources.

In one embodiment, the method further includes repeating receiving requests and allocating antenna resources in a continual manner to achieve efficient utilization of antenna resources.

In one embodiment, allocating antenna resources includes allocating an antenna resource to a channel unit having a highest priority if only one of the requesting channel units has the highest priority.

In one embodiment, allocating antenna resources includes, if multiple requesting channel units have a highest priority, using any arbitrary logic desired, such as allocating an antenna resource to a channel unit having a highest priority that was first in time to send a request.

In one embodiment, the method further includes allocating an antenna resource to a channel unit that has a highest priority if only one of the requesting channel units has the highest priority and a beam associated with a transmit/receive assignment being implemented by the channel unit that has the highest priority is compatible with beams associated with other channel units currently using the antenna resources.

In one embodiment, once a channel unit has been allocated an antenna resource, the channel unit can use the antenna resource until it is no longer needed.

In one embodiment, the antenna resources include multiple array segments of a phased array antenna. In one embodiment, each array segment can be separately allocated to a corresponding channel unit.

In one embodiment, after an antenna resource has been allocated to a first channel unit, the method further includes providing a radio frequency (RF) path between the first channel unit and the allocated antenna resource.

In one embodiment, after an antenna resource has been allocated to a first channel unit, the method further includes retrieving beam parameter data from a memory for a beam of a transmit/receive assignment associated with the first channel unit and using the retrieved beam parameter data to configure the antenna resource allocated to the first channel unit.

In one embodiment, retrieving beam parameter data from a memory includes retrieving a beam identity from a assignment-to-beam lookup table (LUT) for a transmit/receive assignment associated with the first channel unit and retrieving beam parameter data from a beam parameter matrix for the beam identity.

In one embodiment, the method further includes continually updating the assignment-to-beam LUT based on changing beams associated with transmit/receive assignments.

In accordance with a still further aspect of the concepts, systems, circuits and techniques described herein, a system includes multiple channel units implementing an associated transmit/receive assignment having a corresponding priority, the multiple channel units providing requests for access to antenna resources.

In one embodiment, the system further includes means for receiving each of the requests and means for allocating antenna resources to one or more of the multiple channel units in response to the requests based, at least in part, upon priority and request time of arrival.

BRIEF DESCRIPTION OF THE DRAWINGS

The foregoing features of this invention, as well as the invention itself, may be more fully understood from the following description of the drawings in which.

DETAILED DESCRIPTION

The methods and systems described herein relate to techniques for allowing a number of transmit/receive assignments to share antenna resources. As used herein, the phrase "transmit/receive assignment" refers to a sequence of transmit and/or receive events having specific antenna beam requirements. The transmit and/or receive events may be separated from one another by one or more "wait" periods, during which no transmit or receive activity is taking place. Some transmit/receive assignments may only involve transmit periods and wait periods, with no receive periods. In a jamming application, for example, a transmit/receive assignment may involve the transmission of one or more predetermined waveforms toward a jamming target at indeterminate times, with wait periods in between. Some other transmit/receive assignments may only involve receive periods and wait periods, with no transmit periods. In a communications application, for example, a transmit/receive assignment may involve listening for signals from a remote user at various times, with wait intervals in between.

A transmit/receive assignment may be in any one of three states at a particular point in time: transmit, receive, and wait. When in a transmit or receive state, a transmit/receive assignment will need to use an antenna to perform its function. When in a wait state, on the other hand, a transmit/receive assignment will not need to use an antenna. Therefore, when a transmit/receive assignment enters a wait state, an antenna resource that the assignment was using may be made available for use by other assignments. By intelligently switching an antenna between transmit/receive assignments, the various wait periods associated with the transmit/receive assignments can be filled in leading to an enhanced level of antenna usage. As will be described in greater detail, in various implementations, very fast switching antenna architectures may be used that are capable of rapidly changing beam direction/shape to quickly change between transmit/receive assignments.

Figure 1:
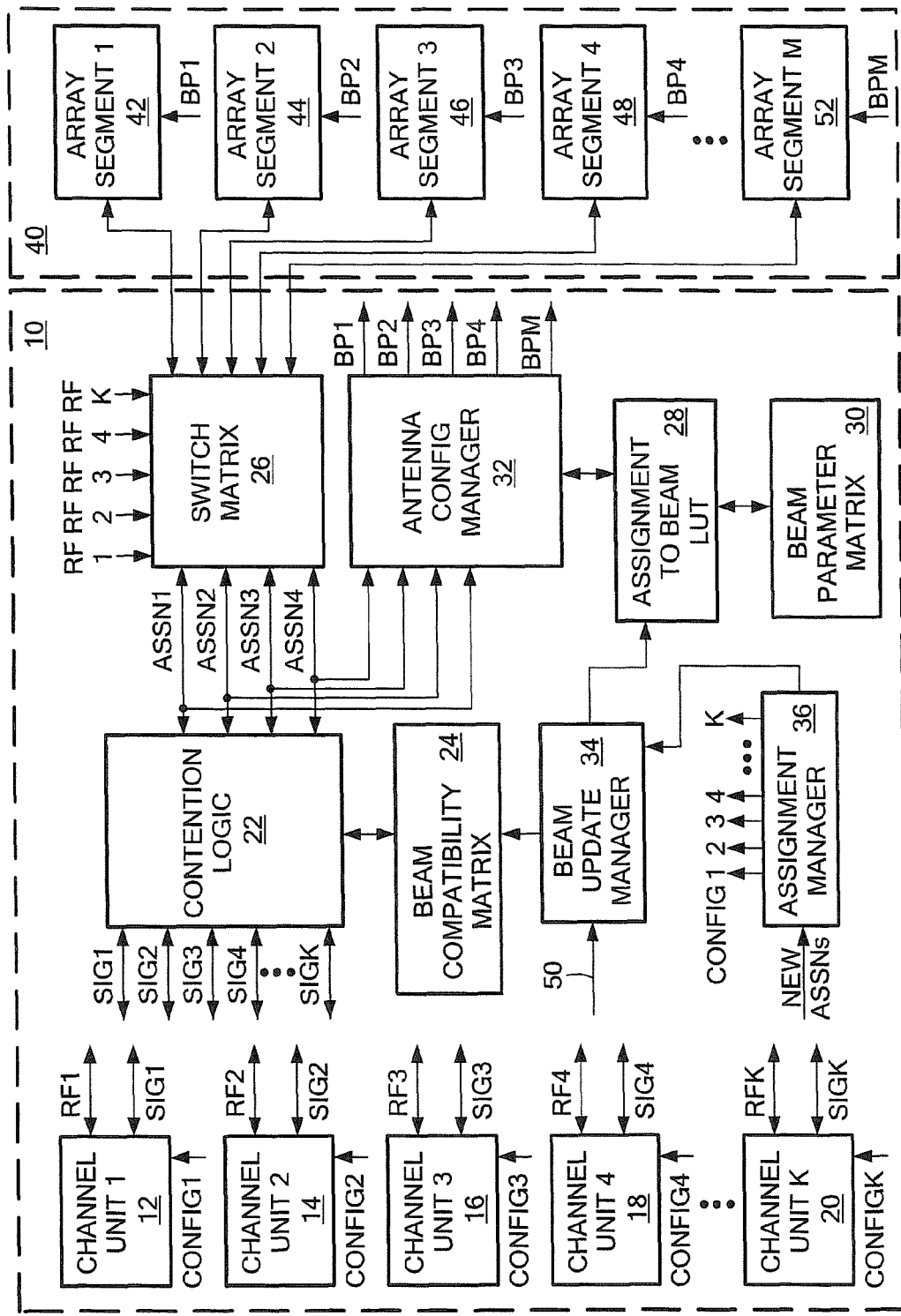
FIG. 1 is a block diagram illustrating an example system for allowing a number of transmit/receive assignments to share antenna resources in accordance with an implementation.

FIG. 1 is a block diagram illustrating an example system 10 for allowing a number of transmit/receive assignments to share antenna resources in accordance with an implementation. System 10 may be used in any number of different applications where transmit and receive tasks can be arranged as transmit/receive assignments and those transmit/receive assignments are to share antenna resources. System 10 may be used with both deterministic and non-deterministic transmit/receive assignments. As illustrated, system 10 may be coupled to an antenna 40.

In general, system 10 of FIG. 1 allows transmit/receive assignments to contend for antenna resources. Each transmit/receive assignment may have an associated priority value that dictates how much preference is to be given to that assignment over other assignments during antenna resource allocation operations. These priority values, as well as one or more other factors, may be considered to determine which assignments are to be given access to antenna resources. Once a decision has been made to allocate an antenna resource to a particular transmit/receive assignment, the antenna resource may be rapidly configured to achieve an appropriate beam for the transmit/receive assignment. An RF path may also be quickly established between the allocated antenna resource and transmit/receive circuitry associated with the transmit/receive assignment.

As illustrated in FIG. 1, system 10 may include: a number of channel units 12, 14, 16, 18, 20; contention logic 22; a beam compatibility matrix 24; a switch matrix 26; an assignment-to-beam lookup table (LUT) 28; a beam parameter matrix 30; an antenna configuration manager 32, a beam update manager 34; and an assignment manager 36. Antenna 40 coupled to system 10 may include, for example, a phased array antenna. In some implementations, an active electronically scanned array (AESA) or similar active array having transmit/receive circuitry located at each antenna element may be used. As illustrated in FIG. 1, antenna 40 may be divided into multiple array segments 42, 44, 46, 48, 52.

Although illustrated with five array segments 42, 44, 46, 48, 52 in FIG. 1, it should be appreciated that any number of different array segments may be used in various implementations.

Channel units 12, 14, 16, 18, 20 are each operative for implementing a corresponding transmit/receive assignment. If a transmit/receive assignment requires a particular RF waveform to be generated, for example, then the associated channel unit may include functionality for generating the RF waveform. If a transmit/receive assignment requires that a particular type of RF signal be received, then the associated channel unit may include functionality for processing the received signal. Any number of channel units 12, 14, 16, 18, 20 may be used in a particular implementation.

Contention logic 22 is operative for allocating antenna resources to transmit/receive assignments (and corresponding channel units) based, at least in part, on assignment priority. Beam compatibility matrix 24 is a data structure in a memory device that stores information on groups of beams associated with current transmit/receive assignments that are compatible with one another. In other words, beam compatibility matrix 24 stores information of groups of beams that can be simultaneously generated by antenna 40 without creating problems in corresponding transmit and receive circuitry (e.g., interference, crosstalk, overloading a receiver front end, etc.). As will be described in greater detail, contention logic 22 may consult beam compatibility matrix 24 during antenna resource allocation operations.

Switch matrix 26 is operative for rapidly providing a radio frequency (RF) path between a channel unit 12, 14, 16, 18, 20 and a corresponding array segment 42, 44, 46, 48, 52 after a transmit/receive assignment has successfully contended for antenna resources. For example, if contention logic 22 allocates second antenna segment 44 to a transmit/receive assignment of channel unit 12, switch matrix 26 may provide an RF path between channel unit 12 and second antenna segment 44 by making specific internal connections. Although a switch matrix 26 is shown in the embodiment of FIG. 1, it should be appreciated that other switching devices, structures, or techniques may be used in other implementations.

Assignment-to-beam LUT 28 is a data structure within a memory device that may include information identifying a particular antenna beam for each transmit/receive assignment being handled by system 10. Beam parameter matrix 30 is a data structure within a memory device that may include beam parameter data for each different beam that antenna 40 or individual array segments 42, 44, 46, 48, 52 may be called upon to create. In general, the beam parameter data may include settings for hardware components within antenna 40 or array segments 42, 44, 46, 48, 52. The beam parameter data may include, for example, phase shift information for phase shifters associated with each active element of an array segment. The beam parameter data may also include, for example, attenuation information for attenuators associated with each active element of an array segment. Other types of information may also be included. For example, in some implementations, beam parameter data may include data for controlling switches, power amplifiers, and/or other circuitry. As will be appreciated, the configurable components within antenna 40 may vary from implementation to implementation. In some implementations, beam parameter matrix 30 may include data for a complete set of antenna states.

Antenna configuration manager 32 is a controller that is operative for managing the configuration of antenna resources in accordance with associated transmit/receive assignments. In a typical scenario, contention logic 22 may indicate to antenna configuration manager 32 a transmit/receive assignment that successfully contended for access to an antenna resource. Antenna configuration manager 32 may then consult assignment-to-beam LUT 28 to identify a beam corresponding to the indicated transmit/receive assignment. The beam identity may then be delivered to beam parameter matrix 30 to retrieve beam parameter data for configuring the corresponding antenna resource. Antenna configuration manager 32 may then deliver the beam parameter data to the antenna resource (e.g., to fourth array segment 48) to configure the resource for use with the transmit/receive assignment. In an alternative implementation, assignment-to-beam LUT 28 may store beam parameter data for configuring the antenna for each transmit/receive assignment, rather than beam identities. This approach may dispense with the need for beam parameter matrix 30.

As described previously, each transmit/receive assignment that is being handled by system 10 may have a specific antenna beam associated with it. This antenna beam will typically be directed from system 10 toward a remote target or communication device related to the transmit/receive assignment. Over time, the locations and/or orientations of the system 10 and a remote target or communication device may change. As such, information about the beam associated with a particular transmit/receive assignment must be updated. Beam update manager 34 is operative for updating and maintaining various memory devices within system 10 that store beam related information. For example, beam update manager 34 may regularly update assignment-to-beam mapping information within assignment-to-beam LUT 28. Beam update manager 34 may also regularly update beam compatibility information within beam compatibility matrix 24. In at least one implementation, beam update manager 34 may receive input information 50 from, for example, an external controller for use in making the beam updates.

Assignment manager 36 is operative for allocating transmit/receive assignments to channel units 12, 14, 16, 18, 20. Assignment manager 36 may be implemented using, for example, a digital processor or similar device. In some implementations, assignment manager 36 may regularly receive lists of new transmit/receive assignments to be handled by system 10. Assignment manager 36 may allocate some or all of these new assignments to corresponding channel units 12, 14, 16, 18, 20. In some cases, assignment manager 36 may decide to reject one or more new assignments. For example, lower priority assignments that may create long switching times back to higher priority assignments may be rejected in some implementations. Other criteria for rejecting assignments may also or alternatively be used. Assignment manager 36 may also be configured to replace one or more assignments currently allocated to a channel unit with a new assignment.

After a transmit/receive assignment has been allocated to a channel unit, the channel unit may need to be configured or programmed to perform the assignment. In some implementations, reconfigurable hardware (e.g., field programmable gate arrays (FPGAs), reconfigurable data path arrays (rDPAs), etc.) may be used to implement all or a portion of channel units 12, 14, 16, 18, 20. As is well known, reconfigurable hardware generally requires configuration parameters to be delivered to the hardware to configure the hardware to perform a particular task. In at least one implementation, a database of assignment configuration parameters (not shown in FIG. 1) may be provided within system 10 for use in configuring channel units 12, 14, 16, 18, 20 for use with corresponding transmit/receive assignments. By using pre-calculated configuration information in this manner, channel units 12, 14, 16, 18, 20 can be configured in a very rapid fashion.

In some implementations, assignment manager 36 may carry out the configuration of channel units 12, 14, 16, 18, 20. In other implementations, channel units 12, 14, 16, 18, 20 may include functionality for self-configuration. That is, assignment manager 36 may only need to send an indication of an allocated transmit/receive assignment to a channel unit and the channel unit may then retrieve a corresponding configuration file from the database to configure itself. In addition to reconfigurable hardware, a channel unit may have one or more other elements that require configuration (e.g., an up-converter, a down-converter, a power amplifier, etc.). The database may include information for configuring these elements as well.

In some implementations, some or all of the channel units 12, 14, 16, 18, 20 may include one or more digital processors. In these implementations, configuration of a channel unit may involve retrieving program code associated with an assignment from a memory and using the program code to program the channel unit.

Although channel units 12, 14, 16, 18, 20 are illustrated in FIG. 10 as separate units, it should be understood that two or more of the units may be implemented within a common reconfigurable hardware device or digital processor in some implementations. It should also be appreciated that the number of active channel units 12, 14, 16, 18, 20 within system 10 may change over time in some implementations. For example, in some implementations, assignment manager 36 may create a new channel unit on occasion to work with a new transmit/receive assignment by appropriately configuring a reconfigurable processing resource. Assignment manager 36 may also terminate one or more of the channel units 12, 14, 16, 18, 20 on occasion to release corresponding processing resources. If assignment manager 36 changes an assignment currently allocated to a channel unit, or configures a channel unit for use with a new assignment, beam update manager 34 may update beam compatibility matrix 24 and assignment-to-beam LUT 28 to reflect the changes.

As described above, each transmit/receive assignment (or each channel unit 12, 14, 16, 18, 20) may have alternating periods during which antenna resources are needed and not needed. In some implementations, channel units 12, 14, 16, 18, 20 may indicate to contention logic 22 when they are in need of antenna resources and when they no longer need them. Contention logic 22 may then use this information to determine which transmit/receive assignments will have access to antenna resources at any particular time. In at least one approach, each channel unit 12, 14, 16, 18, 20 that needs antenna access will send a request to contention logic 22. Contention logic 22 may then select one or more of the requesting channel units to receive antenna access. The selected channel unit(s)/assignment(s) will be referred to herein as the "successful contender(s)." After a channel unit has been selected for antenna access, the corresponding transmit/receive assignment may have access to the allocated antenna resources for as long as it needs them. When the transmit/receive assignment no longer needs antenna access, it may send a release signal to contention logic 22 releasing the corresponding antenna resource. Contention logic 22 may then select another contending channel unit to use the released antenna resource.

After contention logic 22 has selected successful contenders, it may transmit responses to the requesting channel units that indicate whether or not they were successful. In some implementations, the requesting channel units may use this response information to keep track of (or self monitor) their contention success/failure ratio. In some implementations, this success/failure information may be used by assignment manager 36 to determine which transmit/receive assignments are to be replaced within channel units 12, 14, 16, 18, 20. For example, assignment manager 36 may determine that a lower priority alternative transmit/receive assignment may have better success than an assignment currently associated with a channel unit due to less-conflicting timing with higher priority assignments.

If a channel unit is a successful contender, the corresponding transmit/receive assignment may start to use the antenna resource almost immediately. That is, contention logic 22 may signal switch matrix 26 to provide an RF connection between the successful channel unit and a corresponding array segment. Contention logic 22 may also signal antenna configuration manager 32 to configure the array segment with the beam parameters for the transmit/receive assignment. After the RF connection has been made and the configuration is complete, the transmit/receive assignment can begin to perform its transmit or receive operation. As described above, in some implementations, antenna architectures may be used that are capable of switching between beams in a very rapid fashion. An example of one such antenna architecture is described in U.S. patent application Ser. No. 13/350,636 to Noble et al., which is commonly owned with the present application and is hereby incorporated by reference in its entirety.

As described previously, contention logic 22 may select successful contenders based, at least in part, on priority values associated with the corresponding transmit/receive assignments. The priority values may be selected based on any number of different criteria including, for example, the importance of the corresponding tasks, quality-of-service (QOS) designations, and/or others. Before choosing successful contenders, contention logic 22 may first check to determine whether any of the antenna resources (e.g., any of the antenna segments 42, 44, 46, 48) are currently available for use. If antenna resources are available, contention logic 22 may compare all of the requests that have been received to determine which request has a highest priority. In at least one implementation, a request sent by a channel unit may include, for example, an indication of the transmit/receive assignment associated with the request (e.g., an assignment number), an indication of the priority associated with the assignment, and an indication of whether the requested antenna resource will be used to transmit or receive signals. When two requests are received that have different priorities, contention logic 22 may select the contender that has the higher priority. When two requests are received that have the same priority, contention logic 22 may use any logic desired, for example, select the contender that was first in time to send a request. If two array segments are available, contention logic 22 may select the two contenders that have the highest priorities.

In some implementations, contention logic 22 may check beam compatibility matrix 24 before any final contention decisions are made. As described previously, beam compatibility matrix 24 stores information on groups of beams associated with current transmit/receive assignments that are compatible with one another. For example, beam compatibility matrix 24 may not allow two beams to co-exist within antenna 40 if the beams are at the same frequency and one beam is a transmit beam and the other is a receive beam. Other compatibility conditions may also be implemented. If one array segment is available for use and contention logic 22 selects a transmit/receive assignment having a highest priority, contention logic 22 may check beam compatibility matrix 24 to determine whether that transmit/receive assignment (including whether it currently seeks to transmit or receive) is compatible with other transmit/receive assignments that are currently using array segments. If the highest priority assignment is incompatible, contention logic 22 may select the transmit/receive assignment having the next highest priority (or a transmit/receive assignment having the same priority, that sent its request later) to use the available antenna segment. This new transmit/receive assignment may then be checked against beam compatibility matrix 24.

In some implementations, one or more of channel units 12, 14, 16, 18, 20 may request allocation of more than one array segment 42, 44, 46, 48, 52. For example, a transmit/receive assignment associated with channel unit 14 may need to generate a higher transmit power level than can be achieved using a single antenna segment and thus need allocation of two array segments. Contention logic 22 may handle this request in a similar manner to those described previously. For example, if two array segments are available, contention logic 22 may select the higher power assignment if it has the highest priority. If another transmit/receive assignment requesting a single array segment has a higher priority, contention logic 22 may select that assignment and another assignment requesting a single array segment to use the two available segments. If another transmit/receive assignment requesting a single array segment has the same priority as the one requesting two array segments, contention logic 22 may use any logic desired, for example, select the one that sent a request first. If the transmit/receive assignment requesting a single array segment sent the request first, contention logic 22 may also select an additional transmit/receive assignment requesting a single array segment to use the other available array segment. In at least one implementation, contention logic 22 may be implemented using hardware. Software, firmware, and hybrid implementations may alternatively be used.

Figure 2:
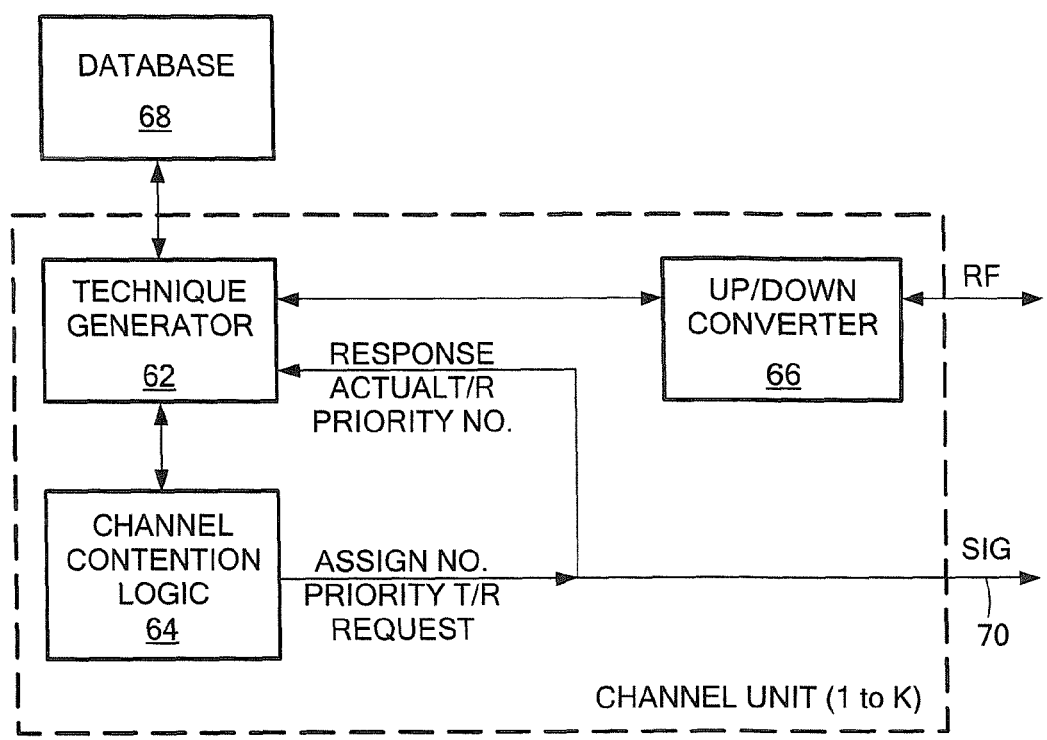
FIG. 2 is a block diagram illustrating a channel unit architecture in accordance with an implementation.

FIG. 2 is a block diagram illustrating functionality within an example channel unit 60 in accordance with an implementation. As illustrated, channel unit 60 may include a technique generator 62, channel contention logic 64, and an up/down converter 66. Technique generator 62 is operative for performing a technique associated with a corresponding transmit/receive assignment. Techniques may involve one or more signal generation, signal reception, signal routing, or other signal processing tasks. Techniques may range from simple to very complex in various implementations. For example, one technique may be as simple as generating a single tone or noise signal for transmission. Another technique may involve a complex sequence of transmitting and listening tasks that may be unpredictable at the time of assignment. This latter situation may arise, for example, when maintaining a voice communication link with a user having a push-to-talk (PTT) handset. When using a PTT handset, a channel is in use when someone pushes a button and speaks, but is not in use when the button is not being pressed. During the period of non-use, antenna resources may be released for use by other assignments. Antenna resources may then be requested every few milliseconds to listen for a signal from the remote handset. As will be appreciated, a wide variety of different techniques may be used in various applications.

Up/down converter 66 is operative for performing a frequency conversion operation required by a corresponding technique. For example, during a transmit operation, up/down converter 66 may operate as an up converter to up convert a modulation signal generated by technique generator 62. During a receive operation, up/down converter 66 may operate as a down converter to down convert RF signals received from a remote location. As will be appreciated, if a technique only involves transmit operations, only an up converter may be required. Likewise, if a technique only involves receive operations, only a down converter may be required. As will be further appreciated, depending upon the implementation, transmit operation may require a down converter and receive operations may require an up converter. Further, in some instances no up/down converter will be needed or it may be bypassed.

Channel contention logic 64 is operative for determining when antenna resources are required by channel unit 60 and for delivering a request to system contention logic (e.g., contention logic 22 of FIG. 1) to request resources in response thereto. In some implementations, a transmit/receive assignment may have specific triggering events or triggers that will determine when antenna resources are needed. Channel contention logic 64 may track these triggers for a corresponding transmit/receive assignment. As described above, in at least one implementation, a request may include an assignment number identifying an assignment, a priority value, and an indication of whether a receive operation or a transmit operation is to be performed. The request may be sent to the system contention logic via, for example, signaling line 70 or another medium. After the request has been sent, a response may be received from the system contention logic that indicates whether the request was granted. This response signal may be directed to technique generator 62. If the request was granted, technique generator 62 may be able to initiate a transmit or receive operation either immediately or after a short delay. Whether or not the request was granted, technique generator 62 may use the response signal to track a contention success/failure rate. When technique generator 62 is finished using the antenna resource, channel contention logic 64 may deliver a release signal to the system contention logic via, for example, signaling line 70 or another medium.

As shown in FIG. 2, channel unit 60 may be coupled to a database 68 storing data for use in configuring channel unit 60. Technique generator 62 may be implemented using, for example, reconfigurable hardware, software, or a hybrid of them in some implementations. Database 68 may include, for example, configuration files for use in configuring the reconfigurable hardware of technique generator 62 to perform a technique associated with the corresponding transmit/receive assignment. Database 68 may also include other data that may be used to configure channel unit 60. For example, database 68 may include a local oscillator (LO) frequency that is to be used by up/down converter 66 to perform a corresponding technique. As described previously, in some implementations, channel unit 60 may include self-configuration functionality that, given an allocated assignment, is capable of retrieving corresponding configuration data for use in configuring its internal circuitry. In other implementations, separate configuration functionality may be provided (e.g., assignment manager 36 of FIG. 1, etc.).

Figure 3:
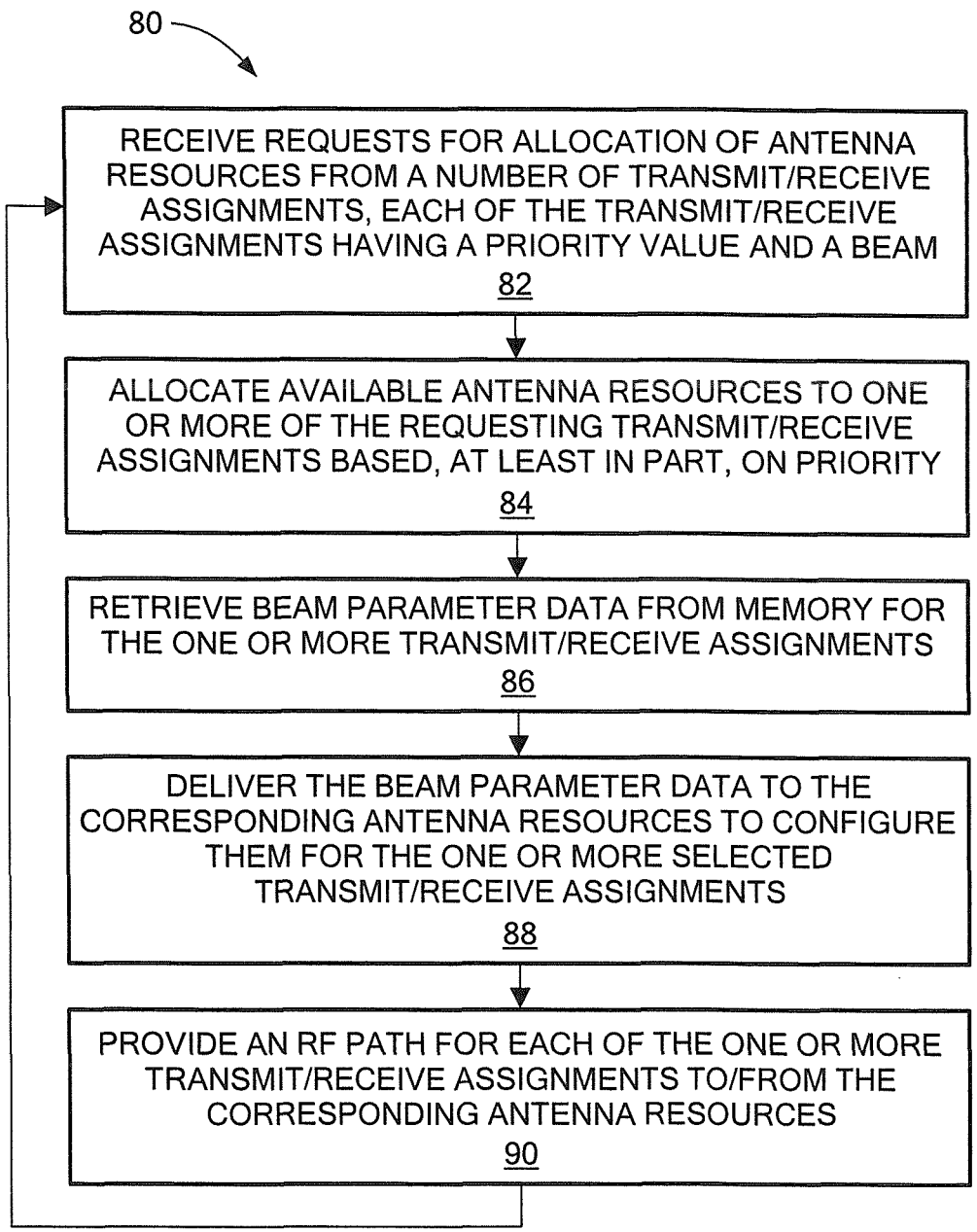
FIG. 3 is a flowchart illustrating a method for allocating antenna resources to a plurality of transmit/receive assignments in accordance with an implementation.

FIG. 3 is a flow diagram showing a process for allocating antenna resources to a plurality of transmit/receive assignments.

The rectangular elements (typified by element 82 in FIG. 3) are herein denoted "processing blocks" and represent computer software or firmware instructions or groups of instructions. It should be noted that the flow diagram of FIG. 3 represents one exemplary embodiment of the design described herein and variations in such a diagram, which generally follow the process outlined, are considered to be within the scope of the concepts, systems and techniques described and claimed herein.

Alternatively, the processing blocks represent operations performed by functionally equivalent circuits such as a digital signal processor circuit or an application specific integrated circuit (ASIC) of a field programmable gate array (FPGA).

Some processing blocks may be manually performed while other processing blocks may be performed by a processor. The flow diagram does not depict the syntax of any particular programming language. Rather, the flow diagram illustrates the functional information one of ordinary skill in the art requires to fabricate circuits and/or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence described is illustrative only and can be varied without departing from the spirit of the concepts described and/or claimed herein. Thus, unless otherwise stated, the processes described below are unordered meaning that, when possible, the sequences shown in FIG. 3 can be performed in any convenient or desirable order.

Turning now to FIG. 3, an example method 80 for allocating antenna resources to a plurality of transmit/receive assignments in accordance with an implementation will be described. Requests for allocation of antenna resources are received for a number of transmit/receive assignments, each of the requesting transmit/receive assignments having a corresponding priority value and beam (block 82). Available antenna resources may then be allocated to one or more of the requesting transmit/receive assignments based, at least in part, on priority (block 84). In addition to priority, one or more other factors may be used to make the antenna resource allocation decision including, for example, request time of arrival. In one possible approach, one or more of the contending transmit/receive assignments that have the highest priorities will be selected to use the available antenna resources. If multiple contending transmit/receive assignments have the same highest priority, assignments may be selected based upon other criteria, such as time of request. In some implementations, beam compatibility may be considered in making the allocation decision. Thus, if the beam associated with the highest priority transmit/receive assignment is not compatible with other beams currently using the antenna resources, another beam may be selected. In some embodiments, once a transmit/receive assignment has been selected for allocation of antenna resources, it will be permitted to use those resources until it no longer needs them, at which time it may release them.

Once a contention decision has been made, beam parameter data may be retrieved from one or more memories for beams associated with the one or more transmit/receive assignments (block 86). The retrieved beam parameter data may then be delivered to the allocated antenna resources to configure them for the one or more transmit/receive assignments (block 88). A radio frequency (RF) path may be provided for each of the one or more transmit/receive assignments to/from the allocated antenna resources (block 90). In at least one implementation, a switch matrix may be used to provide the RF path(s). The method 80 may be repeated in a continual fashion to achieve an enhanced level of antenna usage for a plurality of transmit/receive assignments.

In the implementations described above, antenna resources were divided into array segments that could be individually allocated to transmit/receive assignments. It should be appreciated that this technique is an example of one way that antenna resources may be divided up for use by multiple assignments. Alternative techniques may be used in other implementations. For example, in one alternative approach, a number of different beamforming networks may be provided that each operate using a full antenna array. Other techniques also exist.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A system to process transmit/receive assignments using an array antenna, comprising:
a plurality of channel units that are each configured to perform a corresponding transmit/receive assignment that requires intermittent access to antenna resources, each transmit/receive assignment having an associated priority and generating a request when antenna access is needed;
contention logic to allocate antenna resources to requesting channel units based, at least in part, on assignment priority;
at least one memory to store information mapping transmit/receive assignments to corresponding beam parameter data for use in configuring an allocated antenna resource; and
an antenna configuration manager to configure an allocated antenna resource or use with a channel unit in response to an allocation decision of the contention logic, wherein the antenna configuration manager uses information retrieved from the at least one memory to configure the allocated antenna resource.

2. The system of claim 1, wherein:
the contention logic allocates antenna resources to requesting channel units based, at least in part, on assignment priority and request time-of-arrival.

3. The system of claim 1, wherein:
the antenna resources include multiple array segments; and
the contention logic can allocate each of the multiple array segments to a different channel unit.

4. The system of claim 1, wherein:
each transmit/receive assignment has an associated antenna beam; and
the system further comprises a beam compatibility matrix to store information about antenna beams associated with the transmit/receive assignments that are compatible with one another.

5. The system of claim 4, wherein:
the contention logic is configured to check the beam compatibility matrix to make an allocation decision.

6. The system of claim 1, further comprising:
a beam update manager to update the at least one memory as beams associated with transmit/receive assignments change.

7. The system of claim 1, wherein:
the at least one memory includes an assignment-to-beam lookup table (LUT) to store information mapping transmit/receive assignments to specific antenna beams and a beam parameter matrix to store information mapping specific antenna beams to antenna beam parameters for use in configuring an antenna resource.

8. The system of claim 1, wherein:
the at least one memory includes an assignment-to-beam lookup table (LUT) to store information mapping transmit/receive assignments to antenna beam parameters for use in configuring an antenna resource.

9. The system of claim 1, wherein:
the channel units are implemented using reconfigurable hardware.

10. The system of claim 1, further comprising:
an assignment manager to manage an allocation of channel units to transmit/receive assignments.

11. The system of claim 10, wherein:
the assignment manager is configured to reconfigure a channel unit for use with a different transmit/receive assignment.

12. The system of claim 10, wherein:
the assignment manager is configured to receive a list of new assignments from a controller and accept or reject individual new assignments for allocation of a channel unit.

13. The system of claim 1, further comprising:
a switch matrix to provide a radio frequency path between a channel unit and an allocated antenna resource in response to a decision of the contention logic.

14. The system of claim 1, wherein:
channel units are configured to send a release signal to the contention logic when they no longer need allocated antenna resources.

15. The system of claim 1, wherein;
the contention logic is configured to send a contention decision to a first channel unit in response to a request for antenna access from the first channel unit, the contention decision indicating whether or not antenna resources were allocated to the first channel unit; and
the first channel unit includes a contention success tracking unit to track a success/failure rate of antenna access requests.

16. A machine implemented method comprising:
receiving requests from multiple channel units for access to antenna resources, each of the multiple channel units implementing an associated transmit/receive assignment having a corresponding priority;
allocating antenna resources to one or more of the multiple channel units in response to the requests based, at least in part, on priority; and
in response to an antenna resource being allocated to a first channel unit during allocating, using beam parameter data corresponding to a transmit/receive assignment associated with the first channel unit, retrieved from a memory, to configure the antenna resource allocated to the first channel unit.

17. The method of claim 16, wherein:
allocating antenna resources includes allocating antenna resources to one or more of the multiple channel units in response to the requests based, at least in part, on priority and request time of arrival.

18. The method of claim 16, further comprising:
repeating receiving requests and allocating antenna resources in a continual manner to achieve efficient utilization of antenna resources.

19. The method of claim 16, wherein:
allocating antenna resources includes allocating an antenna resource to a channel unit having a highest priority if only one of the requesting channel units has the highest priority.

20. The method of claim 16, wherein:
allocating antenna resources includes, if multiple requesting channel units have a highest priority, allocating an antenna resource to a channel unit having a highest priority that was first in time to send a request.

21. The method of claim 16, wherein:
allocating antenna resources includes allocating an antenna resource to a channel unit that has a highest priority if only one of the requesting channel units has the highest priority and a beam associated with a transmit/receive assignment being implemented by the channel unit that has the highest priority is compatible with beams associated with other channel units currently using the antenna resources.

22. The method of claim 16, wherein:
once a channel unit has been allocated an antenna resource, the channel unit can use the antenna resource until it is no longer needed.

23. The method of claim 16, wherein:
the antenna resources include multiple array segments of a phased array antenna, wherein each array segment can be separately allocated to a corresponding channel unit.

24. The method of claim 16, further comprising:
after an antenna resource has been allocated to a first channel unit, providing a radio frequency (RF) path between the first channel unit and the allocated antenna resource.

25. The method of claim 16, wherein:
the beam parameter data corresponding to the transmit/receive assignment associated with the first channel unit is retrieved from the memory by first retrieving a beam identity from an assignment-to-beam lookup table (LUT) for the transmit/receive assignment associated with the first channel unit and then retrieving beam parameter data from a beam parameter matrix for the beam identity.

26. The method of claim 25, further comprising:
continually updating the assignment-to-beam LUT based on changing beams associated with transmit/receive assignments.

27. The method of claim 25, further comprising:
after allocating antenna resources, sending an allocation decision to each requesting channel unit indicating whether or not antenna resources were allocated to the channel unit; and
tracking, at each channel unit, an antenna access request success/failure rate for a corresponding transmit/receive assignment.

28. A system comprising:
means for receiving requests from multiple channel units for access to antenna resources, each of the multiple channel units implementing an associated transmit/receive assignment having a corresponding priority; and
means for allocating antenna resources to one or more of the multiple channel units in response to the requests based, at least in part, on priority and request time of arrival.

29. The system of claim 28, wherein:
said means for allocating antenna resources includes means for allocating an antenna resource to a channel unit having a highest priority if only one of the requesting channel units has the highest priority.

30. The system of claim 28, wherein:
said means for allocating antenna resources includes means for allocating an antenna resource to a channel unit having a highest priority that was first in time to send a request if multiple requesting channel units have a highest priority.

31. The system of claim 28, wherein:
said means for allocating antenna resources includes means for allocating an antenna resource to a channel unit that has a highest priority if only one of the requesting channel units has the highest priority and an antenna beam associated with a transmit/receive assignment being implemented by the channel unit that has the highest priority is compatible with beams associated with other channel, units currently using the antenna resources.

32. The system of claim 28, further comprising:
- means for storing information mapping transmit/receive assignments to corresponding beam parameter data for use in configuring allocated antenna resources; and
- means for configuring an allocated antenna resource for use with a channel unit in response to an allocation decision of the means for allocating, wherein the means for configuring uses information retrieved from the means for storing information to configure the allocated antenna resource.

* * * * *

UNITED STATES PATENT AND TRADEMARK OFFICE
CERTIFICATE OF CORRECTION

| | |
|---|---|
| PATENT NO. | : 9,026,161 B2 |
| APPLICATION NO. | : 13/451107 |
| DATED | : May 5, 2015 |
| INVENTOR(S) | : William B. Noble et al. |

It is certified that error appears in the above-identified patent and that said Letters Patent is hereby corrected as shown below:

In the Specification:

Column 1, lines 5-10, Approximately, the first paragraph entitled STATEMENT REGARDING FEDERALLY SPONSORED RESEARCH should read --

This invention was made with Government support under N00019-10-C-0073 and N00019-13-C-0128 awarded by the Department of the Navy. The Government has certain rights in this invention.

Signed and Sealed this
Twenty-ninth Day of March, 2016

Michelle K. Lee
*Director of the United States Patent and Trademark Office*